(12) United States Patent
Biotti et al.

(10) Patent No.: US 8,205,414 B2
(45) Date of Patent: Jun. 26, 2012

(54) METHOD TO PRODUCE A MODIFIED ATMOSPHERE FOR FOOD PRESERVATION

(75) Inventors: Carolina Biotti, Vedano Olona (IT); Claudio Civanelli, Travedona Monate (IT); Andrea Olivani, Milan (IT); Andrew Michael Tenbarge, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/209,669

(22) Filed: Aug. 15, 2011

(65) Prior Publication Data

US 2011/0297241 A1    Dec. 8, 2011

Related U.S. Application Data

(62) Division of application No. 12/343,690, filed on Dec. 24, 2008, now Pat. No. 8,020,360.

(60) Provisional application No. 61/035,775, filed on Mar. 12, 2008.

(51) Int. Cl.
*B65B 31/00* (2006.01)
(52) U.S. Cl. .............................. 53/432; 53/434; 62/331
(58) Field of Classification Search .................. 53/403, 53/408, 432, 434, 79, 84, 85, 510, 512, 167; 62/331
See application file for complete search history.

(56) References Cited

U.S. PATENT DOCUMENTS

| | | | | |
|---|---|---|---|---|
| 2,445,152 A | * | 7/1948 | Poole | 53/432 |
| 3,467,458 A | * | 9/1969 | Simms et al. | 62/337 |
| 3,516,223 A | * | 6/1970 | Andersen et al. | 53/434 |
| 3,937,847 A | * | 2/1976 | Elkins et al. | 62/78 |
| 4,055,931 A | * | 11/1977 | Myers | 53/408 |
| 4,754,611 A | * | 7/1988 | Hosaka et al. | 62/78 |
| 5,046,332 A | * | 9/1991 | Herrmann et al. | 62/78 |
| 5,063,753 A | * | 11/1991 | Woodruff | 62/78 |
| 5,136,853 A | * | 8/1992 | Girardon et al. | 62/78 |
| 5,157,940 A | * | 10/1992 | Bertu et al. | 62/382 |
| 5,271,240 A | * | 12/1993 | Detrick et al. | 62/331 |
| 5,457,963 A | * | 10/1995 | Cahill-O'Brien et al. | 62/78 |
| 5,996,370 A | * | 12/1999 | Lee | 62/407 |

(Continued)

FOREIGN PATENT DOCUMENTS

CN    1225253 A1 *   8/1999

(Continued)

*Primary Examiner* — Stephen F Gerrity
(74) *Attorney, Agent, or Firm* — Kirk W. Goodwin; Price Heneveld, LLP

(57) ABSTRACT

An appliance system including a module removably mounted to an appliance, one or more removable gas canisters operably connected to the module, and a food retaining enclosed space operably connected to the module. The one or more gas canisters supply a modified atmosphere in the food retaining enclosed space to produce a modified atmosphere that enhances preservation of the food contained in the food retaining enclosed space. A method of modifying the atmosphere in a food storage space for food includes the steps of: providing a module capable of being removably engaged to an appliance and typically receiving power from the appliance and at least one removable gas canister; operatively connecting or otherwise engaging the module with the appliance; operatively connecting or otherwise engaging the module to a food storage area having an existing atmosphere; and removing at least a portion of the existing atmosphere from the food storage space and replacing it with a modified food storage atmosphere using at least one of the at least one removable gas canisters to supply the modified atmosphere to the food storage area.

20 Claims, 11 Drawing Sheets

PHASE 1 - AMBIENT AIR REMOVAL

PHASE 2 - MODIFIED ATMOSPHERE APPLICATION

U.S. PATENT DOCUMENTS

| | | | | |
|---|---|---|---|---|
| 6,035,769 | A * | 3/2000 | Nomura et al. | 99/472 |
| 6,148,875 | A * | 11/2000 | Breen | 141/65 |
| 6,185,913 | B1 * | 2/2001 | Cappi et al. | 53/510 |
| 6,675,604 | B2 * | 1/2004 | Lee et al. | 62/407 |
| 6,942,834 | B2 * | 9/2005 | Gutman | 422/29 |
| 7,048,136 | B2 * | 5/2006 | Havens et al. | 220/212 |
| 7,331,163 | B2 * | 2/2008 | Hau et al. | 53/512 |
| 7,360,371 | B2 * | 4/2008 | Feinauer et al. | 62/169 |
| 2002/0083724 | A1 * | 7/2002 | Tarlow et al. | 62/131 |
| 2006/0010890 | A1 * | 1/2006 | Feinauer et al. | 62/169 |
| 2006/0090427 | A1 * | 5/2006 | Hau et al. | 53/512 |
| 2009/0255221 | A1 * | 10/2009 | Lyman, Jr. | 53/512 |
| 2011/0094190 | A1 * | 4/2011 | Espinosa | 53/434 |

FOREIGN PATENT DOCUMENTS

| | | | |
|---|---|---|---|
| EP | 253434 | A2 * | 1/1988 |
| EP | 1093726 | A1 * | 4/2001 |
| EP | 1798147 | A1 * | 6/2007 |
| KR | 1020040083548 | A * | 10/2004 |
| WO | WO 2007020581 | A1 * | 2/2007 |

* cited by examiner

FIG. 11
PHASE 2 – MODIFIED ATMOSPHERE APPLICATION

FIG. 10
PHASE 1 – AMBIENT AIR REMOVAL

METHOD TO PRODUCE A MODIFIED ATMOSPHERE FOR FOOD PRESERVATION

CROSS REFERENCE TO RELATED APPLICATION

This application is a divisional of U.S. application Ser. No. 12/343,690, entitled DEVICE AND METHOD TO PRODUCE A MODIFIED ATMOSPHERE FOR FOOD PRESERVATION, filed on Dec. 24, 2008, now U.S. Pat. No. 8,020,360, the entire contents of which are incorporated herein by reference. Application Ser. No. 12/343,690 claims priority to and the benefit of U.S. Provisional Patent Application No. 61/035,775 filed on Mar. 12, 2008, entitled REFRIGERATOR WITH SPACE MANAGEMENT MODULES, the entire contents of which are hereby incorporated by reference.

SUMMARY OF THE INVENTION

An embodiment of the present invention typically includes an appliance system that includes a food retaining compartment, a module removably connectable to an appliance, and at least one removable gas canister that includes all or a portion of a modified atmosphere to be added to the food retaining compartment. The module typically includes a pressure sensitive device for sensing the level of gas being removed or added to the food retaining compartment; a valve for regulating the removal of gas from the food retaining compartment and a valve for regulating the addition of a modified atmosphere and a gas moving device, typically a vacuum pump.

Another embodiment of the present invention includes a module for providing a modified atmosphere to a food retaining space having a volume where the module is removably engageable to an appliance. The module typically includes: a housing; at least one removable gas canister that includes all or a portion of a modified atmosphere to be added to a food retaining space; a pressure sensitive device for sensing the level of gas being removed or added to the food retaining space; a valve for regulating the removal of gas from the food retaining space and a valve for regulating the addition of a modified atmosphere and a gas moving device.

Yet another embodiment of the present invention is directed toward a method of providing a modified atmosphere to a food storage space having a volume for enhancing the preservation of food stored in the food storage space when the food storage space contains the food and the modified atmosphere. The method typically includes the steps of: providing a food storage space having a volume, a module removably connectable to an appliance that includes a first valve for regulating gas to and/or from the food storage space, a vacuum pump, and a gas canister engaging inlet, and at least one removable gas canister containing a compressed gas; engaging the gas canister to the gas canister-engaging inlet of the module so as to operably connect the compressed gas with the module; engaging the module with an appliance such that the module receives power from the appliance; operably engaging the food storage space with the module such that gas is capable of moving out of and into the food storage space; activating the module thereby causing the module to perform the steps of: activating the vacuum pump and, if not already closed, closing the first valve to thereby draw an amount of ambient air from the food storage space; stopping the vacuum pump; opening the first valve to allow gas flow from the gas canister into the food storage space; and filling the food storage space with at least a portion of the compressed gas from the gas canister thereby forming all or part of the modified atmosphere.

These and other features, advantages, and objects of the present invention will be further understood and appreciated by those skilled in the art by reference to the following specification, claims, and appended drawings.

DETAILED DESCRIPTION OF THE PREFERRED EMBODIMENT

Figure 1:
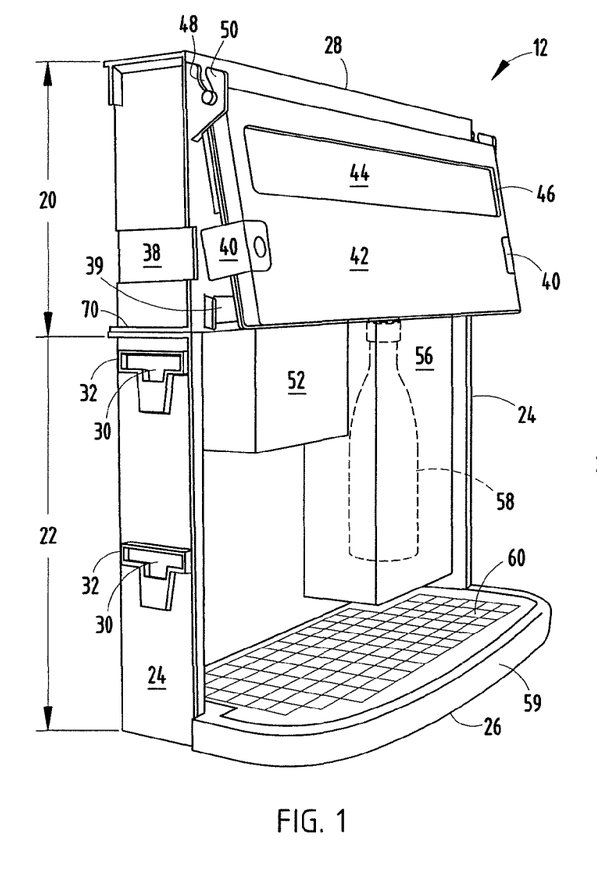
FIG. 1 is an elevated perspective view of an embodiment of a module of the present invention.
Figure 2:
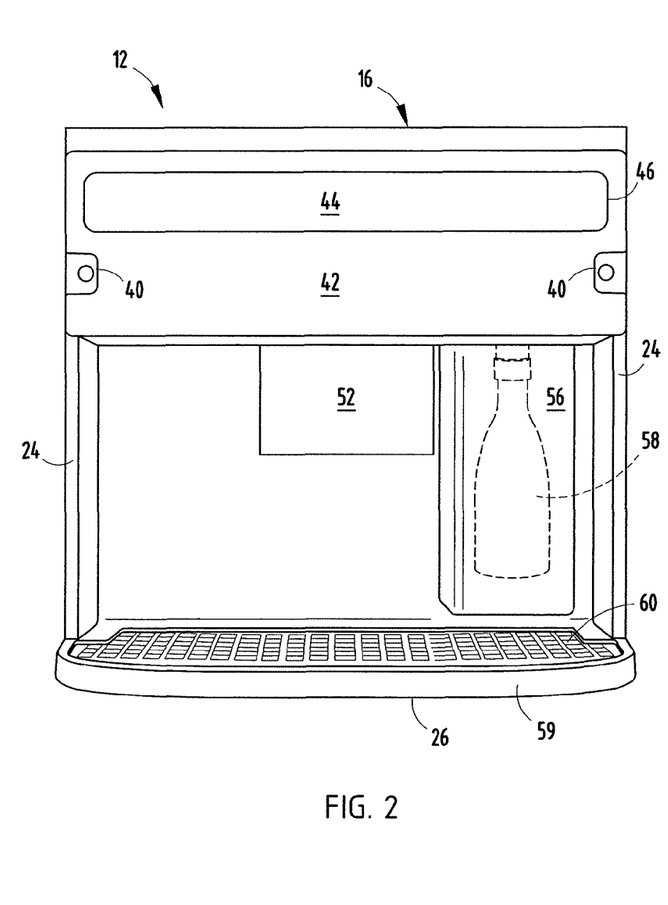
FIG. 2 is an elevated front view of an embodiment of a module of the present invention.

The present invention generally relates to a removably connectable module that forms part of an appliance system. As shown in FIGS. 1-2, the appliance system typically contains a module 12 capable of forming a modified atmosphere within a food retaining compartment/space that has a volume in an appliance and/or facade or module receiving housing that can sit on a countertop and either be powered using a direct connection or an umbilical-type power connection 11 or electrically connected to a standard electrical socket when the module receiving housing and the module are placed on a countertop or the like. Typically, the appliance 10 is a refrigerator, but conceivably could be any appliance such as a refrigerator and freezer combination, refrigerator, or freezer alone or could also be a refrigerated space that receives cooler air from another source such as a freezer compartment. Most preferably, the appliance contains a refrigerator compartment that has an inner liner. Whether a traditional appliance or a refrigerated space, the appliance typically is capable of providing electrical power to the module when the module is operatively connected to the appliance. Generally speaking, the module operates to evacuate the food retaining compartment/space (typically a container, bag or other compartment/space 14). When the food retaining compartment/space is a bag, it may be a heat-sealable bag and the bag may also optionally be either of fixed volume or expandable. When the food retaining compartment/space is a fixed volume container, a fixed geometry container or a fixed volume compartment within the module, the compartment typically has one or more valves.

The modified atmosphere injected into the food containing compartment/space 14 extends the freshness of refrigerated food. The atmosphere selected is customizable so that it best extends the life of the food or food group that the consumer wishes to extend the life thereof.

The modified atmosphere module generally includes a housing 16 and a control device 18 typically positioned within the housing. The housing typically contains an upper portion 20 and a lower portion 22 with the control device typically contained within the upper portion 20 of the housing 16 as well as two sides 24, a bottom surface 26 and a top surface 28. The sides typically have at least one, more typically a plurality, substantially T-shaped appliance-receiving groove 30 that is formed by a raised substantially T-shaped portion 32 along the perimeter of the groove 30. This configuration operates by engaging mating elements of the appliance to retain the module in engagement with the appliance, usually along the liner of the appliance or other chamber of the appliance. Typically, the module engages the inner surface of the liner of the appliance 34 and the mating elements of the appliance are along the inward facing surfaces 36 of the liner mutually facing one another. Typically, the module is held in engagement with the appliance at least partially, more typically substantially or entirely by pressure fit between the inward facing surfaces of the appliance and the sides of the module.

Typically, the upper portion of the module has at least one snap release receiving groove 38 along the sides of the module for receiving/engaging a push button snap release element 40 of a covering component 42 that may optionally contain a control panel 44 or be configured to allow access to a control panel that is a part of the module through an aperture/window 46 (typically along the user facing surface of the module) when the covering component is engaged to the upper portion of the module. The covering is held in place at least partially by at least one biased component, but more typically two or more biased components 39 that frictionally engage the covering component, typically along the sides. Usually, the covering component contains at least one cover appendage 48 along each side of the covering component that operatively connects/engages upwardly extending cover receiving grooves 50 along the sides of the upper portion of the module.

Typically, the front/user facing surface of the lower portion of the module is solid and typically will contain a projection portion 52 that also forms a recessed portion 54 in the opposite rearward facing side of the module. The lower portion of the module also typically contains a user removable gas canister cover 56 that covers the gas canister(s) or receptacles from view when the canister engages with the gas-canister receiving inlet. The lower portion of the module also typically incorporates a user-facing tray 59 that is typically capable of supporting the food retaining compartment/space with or without food within the compartment. The tray also typically contains an optionally removable lattice structure 60 to allow small food components to fall between the spaces in the gridwork. Typically the lattice structure is sized to fit within the entire tray but conceivably only a portion of the tray may include a lattice structure and the remainder of the tray may be flat and smooth or the tray could be entirely flat and smooth. Also, the tray could be textured to provide a slip resistant surface.

Figure 3:
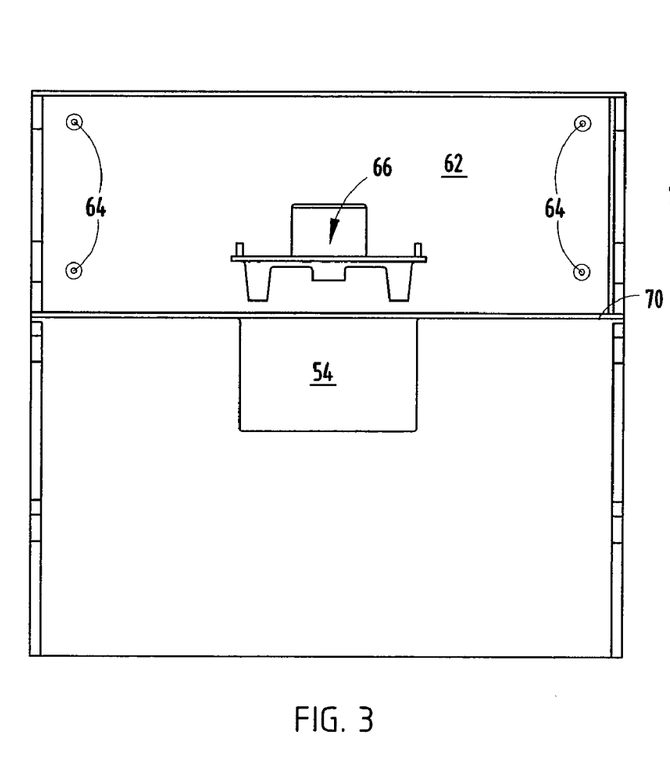
FIG. 3 is an elevated rear view of an embodiment of a module of the present invention.
Figure 4:
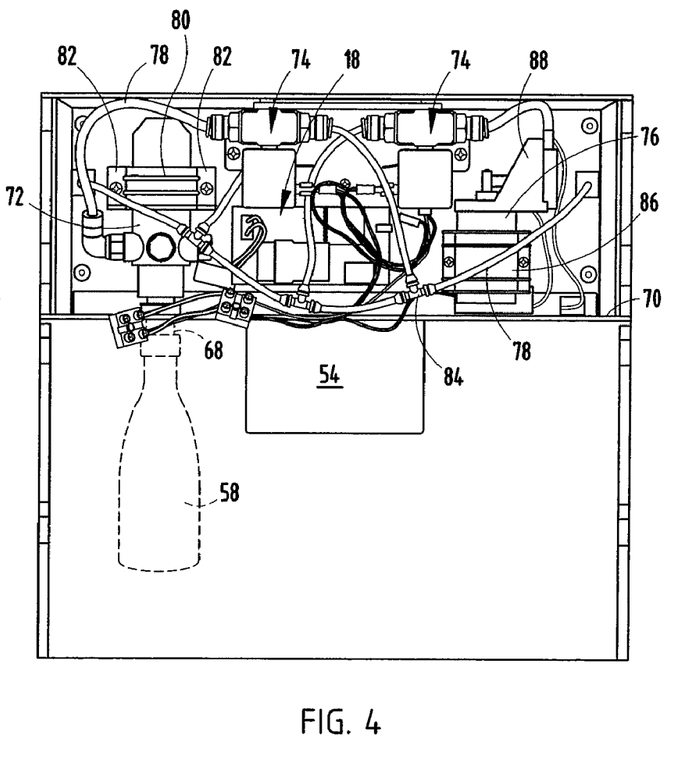
FIG. 4 is an elevated rear view of an embodiment of a module of the present invention with the rearward cover of the upper portion of the module removed.
Figure 5:
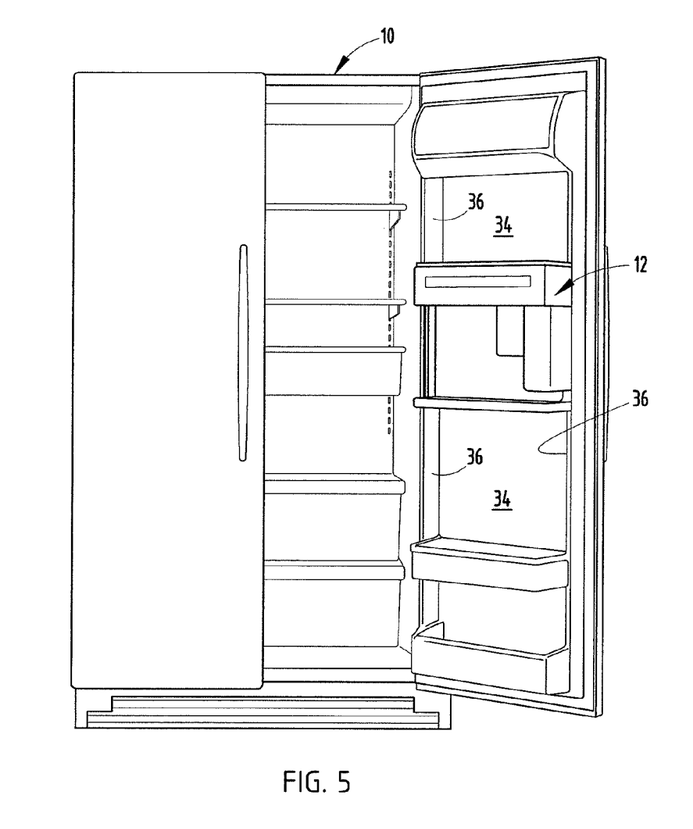
FIG. 5 is an elevated front view of a side-by-side refrigerator/freezer appliance with a module according to an embodiment of the present invention engaged to the inner door liner surface of the refrigerator section of the appliance.
Figure 6:
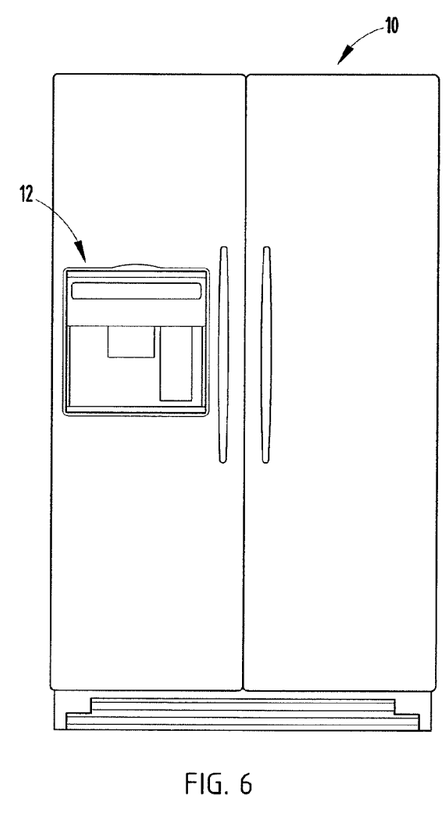
FIG. 6 is an elevated front view of a side-by-side refrigerator/freezer appliance with a module according to an embodiment of the present invention engaged to the outer door surface of the appliance.
Figure 7:
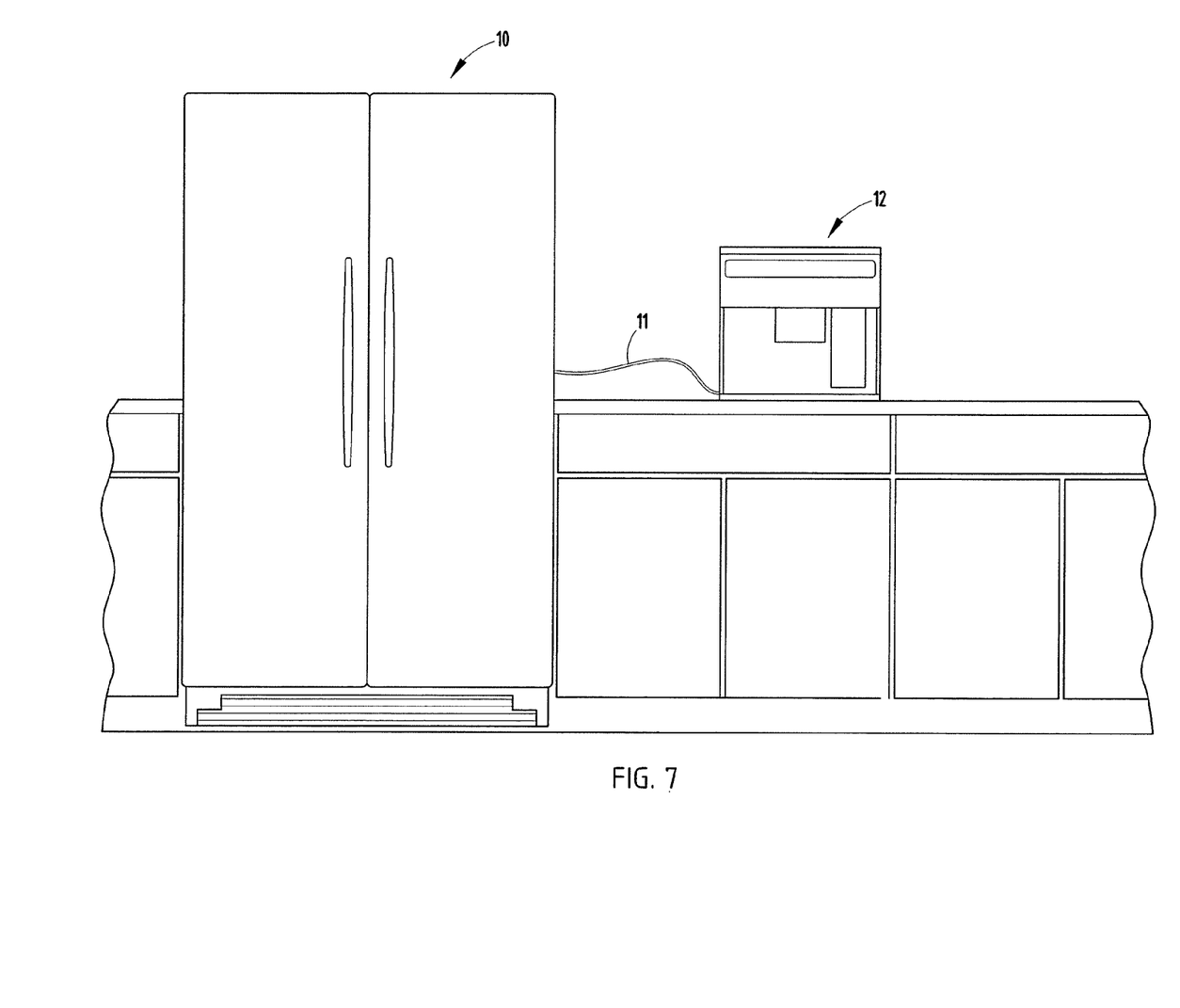
FIG. 7 is an elevated view of another embodiment of the present invention where the module receives power from the appliance using an electrical umbilical connection between the module and the appliance.
Figure 8:
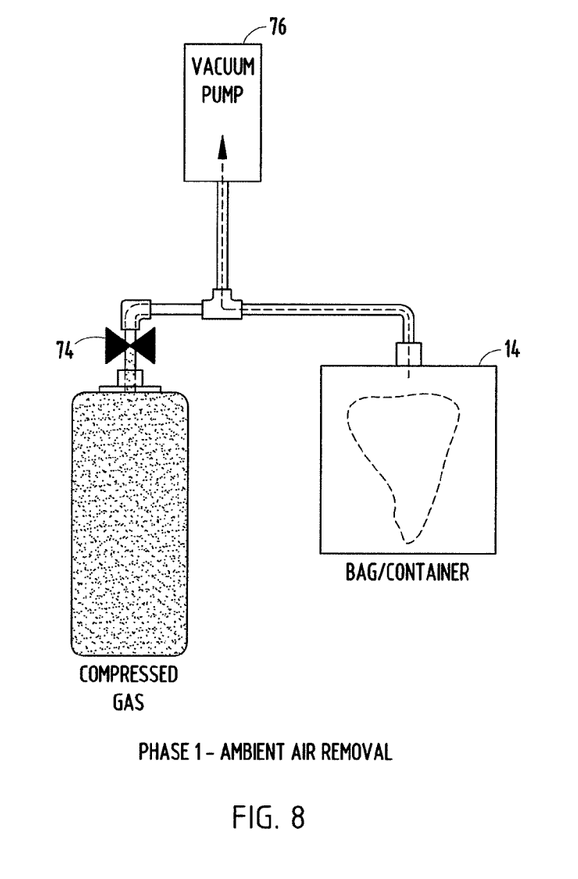
FIG. 8 is an embodiment of the present invention showing the use of one valve to regulate flow of the gas into and out of the food retaining compartment/space with the valve in the closed position to not allow gas to flow from the gas canister and depicting the gas being removed from the compartment/space.
Figure 9:
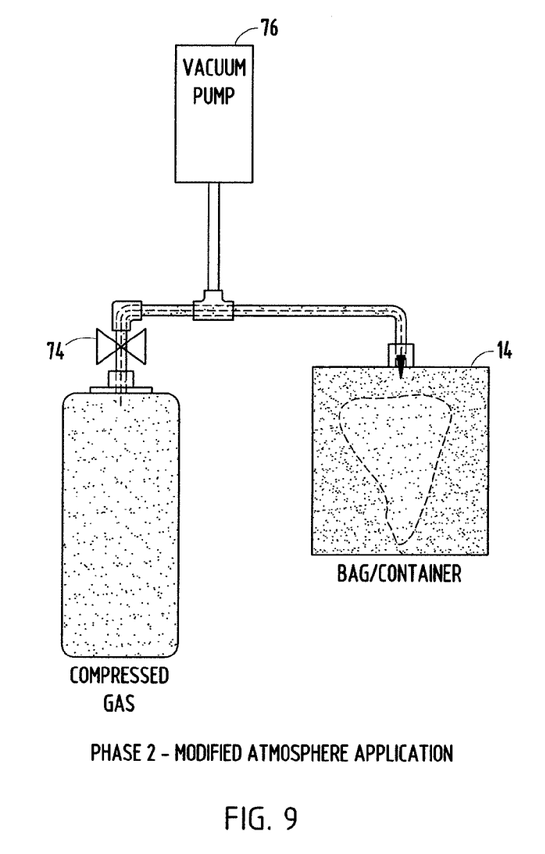
FIG. 9 is the embodiment of the present invention shown in FIG. 8 with the valve in the open position with gas from the canister being supplied to the food retaining compartment/space.
Figure 10:
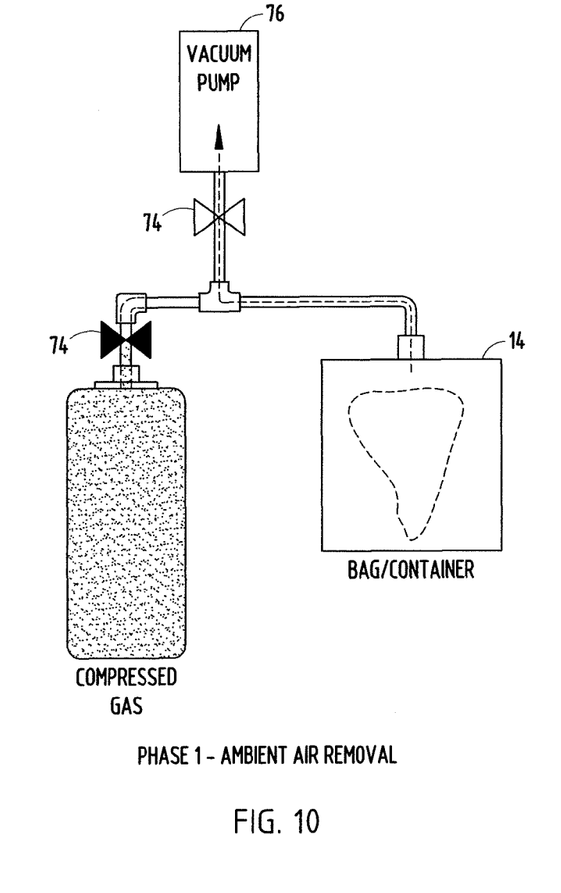
FIG. 10 is the embodiment of the present invention shown in FIGS. 8-9 with a second valve positioned between proximate the vacuum pump and proximate the compressed gas canister showing the system in the ambient gas removal mode.
Figure 11:
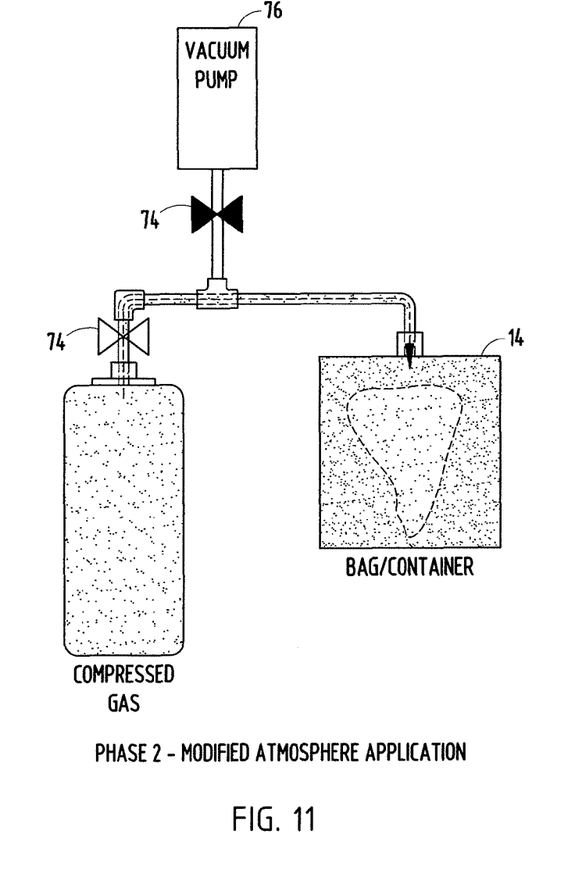
FIG. 11 is the embodiment of the present invention shown in FIG. 10 showing the system supplying modified atmosphere to the food retaining compartment/space with the valve proximate the compressed gas in the open position and the valve proximate the vacuum pump in the closed position.
Figure 12:
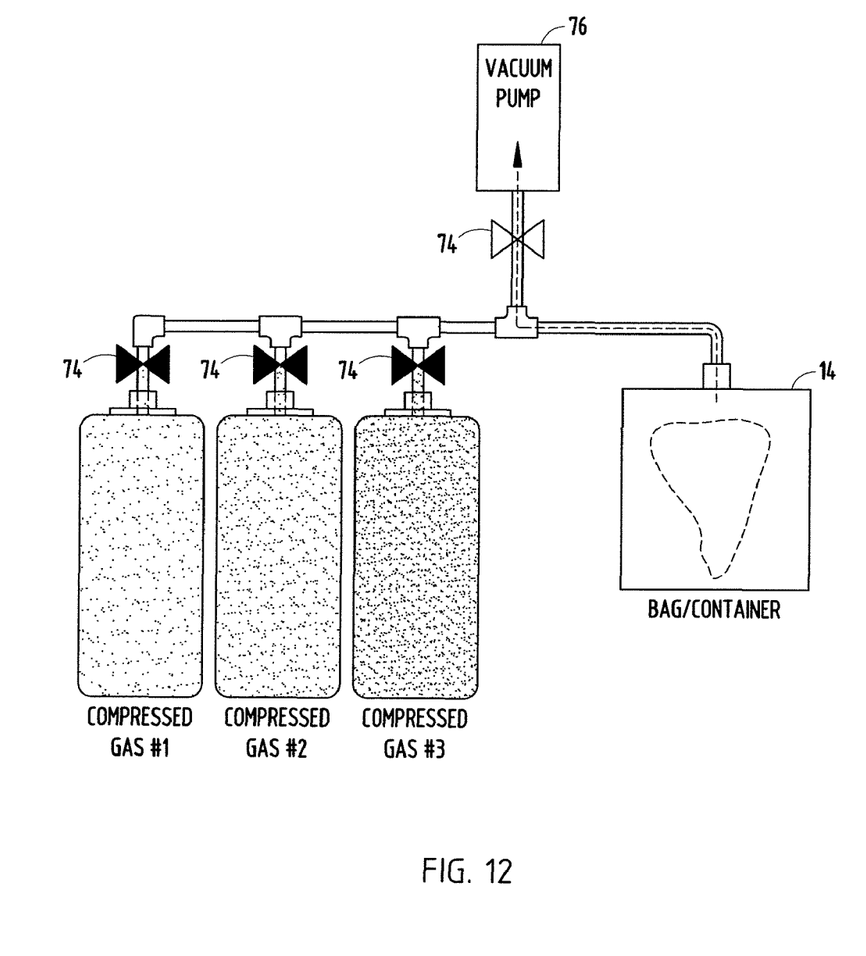
FIG. 12 is another embodiment of the present invention showing a plurality of gas canisters in the ambient gas removal mode.
Figure 13:
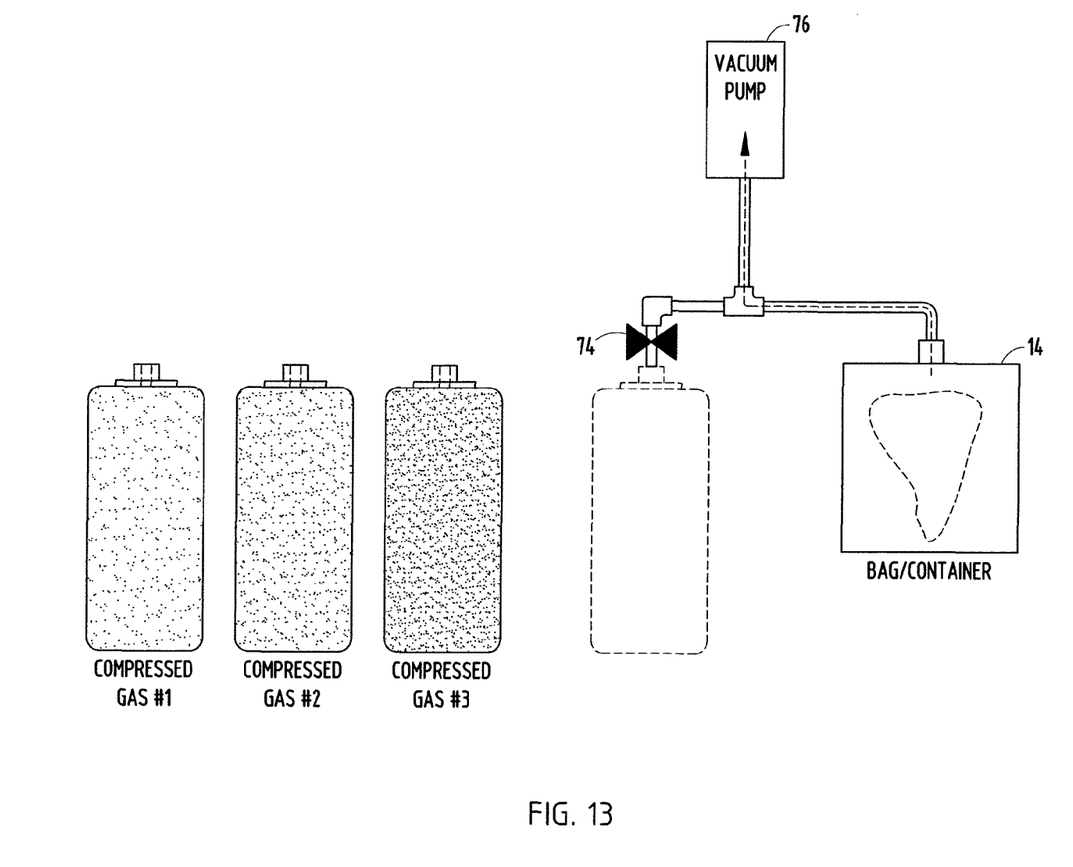
FIG. 13 is another embodiment of the present invention showing multiple compressed gas canisters that can be connected through one inlet to supply the modified atmosphere.

As can be seen in FIGS. 3-4, the rearward facing surface of the module typically contains an upper portion rearward-side cover 62 that covers the main operating elements of the module contained within the upper portion of the module. The rearward-side cover 62 is typically held in place with at least one, more typically a plurality of fasteners such as screws 64. Typically the rearward side of the upper portion also has an appliance/power connector 66 that receives the connection from the appliance or other power source for the electrical power of the module.

As shown in FIG. 4, the upper portion of the module typically contains or is proximate at least one gas receiving inlet 68. The gas receiving inlet is typically spaced just within the lower portion of the module to allow easy connection of the canister through a typically circular aperture in the dividing wall 70 between the upper portion and the lower portion of the module. Conceivably, a plurality of gas receiving inlets/connections can be utilized to receive a variety of different gas canisters. The gas canisters typically have a volume of about one liter or less. The gas canisters and inlet(s) may be configured such that the gas canisters will only release gas when engaged to an inlet of the module without damaging the canister. The canisters and/or inlet may be configured such that when the canister(s) is(are) operatively connected to the inlet, the control device senses the type of gas contained within the canister. The module is also able to estimate or measure the amount of gas remaining in the canister that is connected to the inlet. The gas canisters may contain one of many different types of gases used to create a final modified atmosphere or may contain a mixture of gases preblended to form a given modified atmosphere that best extends the life of a given food product. It is also possible that the gas canister will contain a single gas that is the only gas used to create the modified atmosphere.

Typically, the gas proceeds through the inlet and then through a pressure reducer 72 when gas is being supplied to the module. The pressure reducer is typically engaged with the upper portion of the module or held in place using a substantially C-shaped retainer 80 with two flat surfaces 82. The two flat surfaces typically each receive at least one fastener, typically a screw, which also engages the upper portion of the housing of the module on the interior surface. The upper portion also typically contains one or more valves 74 that are typically solenoid valves as well as a vacuum pump 76. A substantially C-shaped vacuum pump bracket 86 with two substantially flat ledges retains the vacuum pump within the housing using fasteners, typically screws that engage the vacuum pump bracket and the housing. Optionally, a second vacuum pump stabilizing bracket 88 can be used to further stabilize the vacuum pump within the housing. Tubing 78 capable of having gas move within it typically is used to distribute the gases and may be interconnected using connectors and/or one or more T-junction connectors 84. Typically, electrical wiring is used to distribute power to the electrically powered elements of the module, including the solenoid valves, the control device, and the vacuum pump.

The upper portion of the module also typically contains at least one control device that is typically a control board in combination with a relay or a microcontroller. A microcontroller is a functional computer system on a chip that typically contains a processor core, memory, and programmable input/output peripherals. The memory may be RAM, program memory or both. The control device is typically connected with an input receiving device for receiving instructions from a user. Typically the input from the user in the case of the module of the present invention is a control panel with push button or touch sensitive controls. The input receiving device is configured to receive input from the user including what type of modified atmosphere is desired. The control device is configured to be responsive to input from the user that instructs the control device to perform steps based at least in part upon the user input. The control device typically operates to control various other components of the module including the vacuum pump and the opening and closing of the valves. The control device, in the case of a microcontroller, typically has memory that utilizes a calibration curve for estimating the free volume in a container based upon the time necessary to remove ambient air in the food retaining space to a predetermined level at least substantially below ambient pressure and also based upon one or more characteristics of the vacuum pump (for example, the vacuum pump's strength). Typically, the calibration curve is stored in the memory of the microcontroller. In this manner, the control device can approximate when to turn off the vacuum pump and begin to supply modified atmosphere to the food retaining compartment/space.

Also, optionally, the module may contain one or more gas storage chambers typically within the module where the gas storage chamber(s) are operably connected to the food retaining compartment/space and the chamber(s) can be filled from individual corresponding inlets that receive a gas canister or can be filled through the use of one inlet and valves, typically solenoid valves positioned outside each chamber such that one or more specified gas storage chambers are filled at a given time from the gas canisters. The gas storage chamber could be used to supply all or a portion of the modified atmosphere to the food retaining compartment/space. When only a portion is supplied, the remainder of a given gas for the modified atmosphere can be supplied from the gas canister engaged to the inlet.

The module may also contain a heat-sealing element, which operates to seal the bag, including a flexible bag when such bags are used at a food storage compartment/space. When utilized, the heat sealing element can be positioned where most convenient to the user, typically in the upper portion of the module and accessible to the user, more typically along the front surface of the module and accessible to the user.

Figure 14:
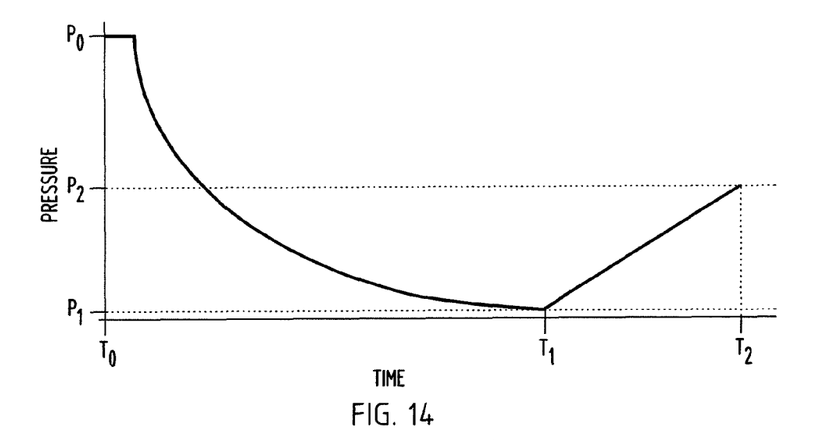
FIG. 14 shows a pressure v. time curve where the opening time of the modified atmosphere supplying valve ($T_2$-$T_1$) depends on the emptying time ($T_1$-$T_0$) and is calculated to have only a fraction of atmospheric pressure within the food retaining compartment/space when the modified atmosphere has been supplied to the food retaining compartment/space.
Figure 15:
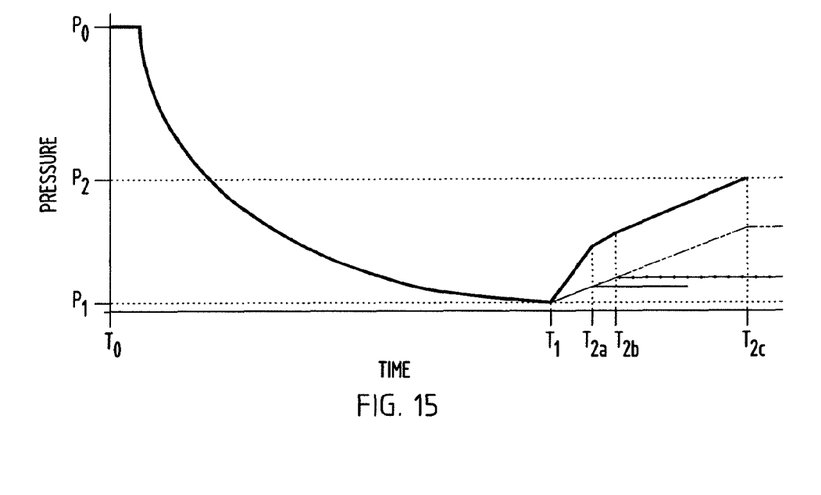
FIG. 15 shows a pressure v. time curve where the opening time for the valves ($T_2$-$T_1$) depends on the emptying time ($T_1$-$T_0$) and the valves proximate a plurality of gas canisters (a,b,c) are opened for a calculated time in order to build a predetermined partial pressure of gases that form a predetermined blend of gases that make up a modified atmosphere.

The module can also contain one or more sensors or switches. These devices can be used to measure and/or detect when the desired pressure level is reached inside the food retaining compartment/space. In one embodiment, a pressure senor can be used to measure the pressure produced as a result of the gas or gases being filled into the food retaining compartment/space. Even in the case of different gases, the sensor can monitor the pressure contribution of each gas filled in sequence (see FIGS. 14-15). Another alternative is to use one or more pressure switches to detect when, during the modified atmosphere injection process, the pressure rises to the appropriate level in the food retaining compartment/space and stop the process. This is typically achieved through the use of at least two pressure switches, but could use one pressure switch that uses the hysteresis of the first switch to detect when to stop/start the process. Also, a standard switch can be utilized to estimate the free volume in the food retaining compartment/space. In this instance, the time to empty or substantially empty the food retaining compartment is measured by the control device, typically a microcontroller. The microcontroller typically uses a calibration curve (container free volume vs. emptying time) for the specific vacuum pump being utilized in the module to determine the container free volume and therefore the amount of time to allow modified gas or mixture of gases to flow into the container to prepare the modified atmosphere at a predetermined pressure level. The sensor could also be a light or other optical sensor used to regulate the amount of the modified atmosphere by measuring, for example, the characteristics of how much light is allowed to reach the sensor and/or how light is deflected As shown in FIGS. 14-15, switching on the vacuum pump at the time $T_0$, the container starts to empty at a decreasing rate because less gas is extracted by the pump over time. After time $T_1$-$T_0$, which depends on the volume of the food retaining compartment/space, the pressure reaches the predetermined vacuum level $P_1$. The microcontroller can use this time ($T_1$-$T_0$) to estimate the free volume inside the food retaining compartment/space using the calibration curve. It is then possible to calculate the amount of gas required to achieve the target pressure $P_2$. Typically, this is done by the microcontroller, which communicates with the solenoid valve and the solenoid valve opens to allow gas flow from the gas storage chamber and/or gas canister. Similarly, the above can be used when various bottles of gases are used to fill the food retaining container/space, which is typically the case when multiple canisters of different gas as opposed to a canister with a predetermined blend of different gases is used to create the modified atmosphere. In such a case, more than one valve (three valves a, b, and c are shown in FIG. 15) are opened for a time interval corresponding to the amount of gas needed to form the modified atmosphere. The valves are typically opened independently in order to have the required gas mixture inside the container. $T_{2a}$-$T_1$ is the opening time for the first valve, $T_{2b}$-$T_{2a}$ is the opening time of the second valve, $T_{2c}$-$T_{2b}$ is the opening time for the third valve in FIG. 15. When forming the modified atmosphere it is typically desirable to keep the final modified atmosphere pressure less then atmospheric pressure to ensure the automatic sealing of the food retaining compartment/space. Typically, the final modified atmosphere pressure is about ½ atmospheric pressure, or about ½ atmospheric pressure or less.

The modified atmospheres for use over food products according to an embodiment of the present invention include a modified atmosphere for a meat product, a dairy product, a fruit product, a vegetable product and a fish product. The modified atmosphere may be either oxygen rich or have a reduced oxygen content compared to ambient air. Also, the modified atmospheres of the present invention also typically operate to reduce both aerobic and anaerobic pathogens in the food stored under the modified atmosphere. The modified atmosphere for the meat product typically contains about 70% by volume oxygen, about 20% by volume carbon dioxide, and about 10% by volume nitrogen. The modified atmosphere for the fish product typically contains about 40% by volume carbon dioxide and about 60% by volume nitrogen. The modified atmosphere for fruits or vegetables typically contains from about 3% to about 10% by volume oxygen, from about 3% to about 10% by volume carbon dioxide, and from about 80% to about 94% by volume nitrogen. The modified atmosphere for dairy products typically contains from about 10% to about 30% by volume carbon dioxide and from about 70% to about 90% by volume nitrogen. Applicants also believe that a modified atmosphere can be used for medications. For example, medications that might be prone to oxidation might have their shelf life improved by being stored in a container with a modified atmosphere with reduced oxygen content to prevent or retard oxidation. The modified atmosphere is typically over the medication.

Figure 16:
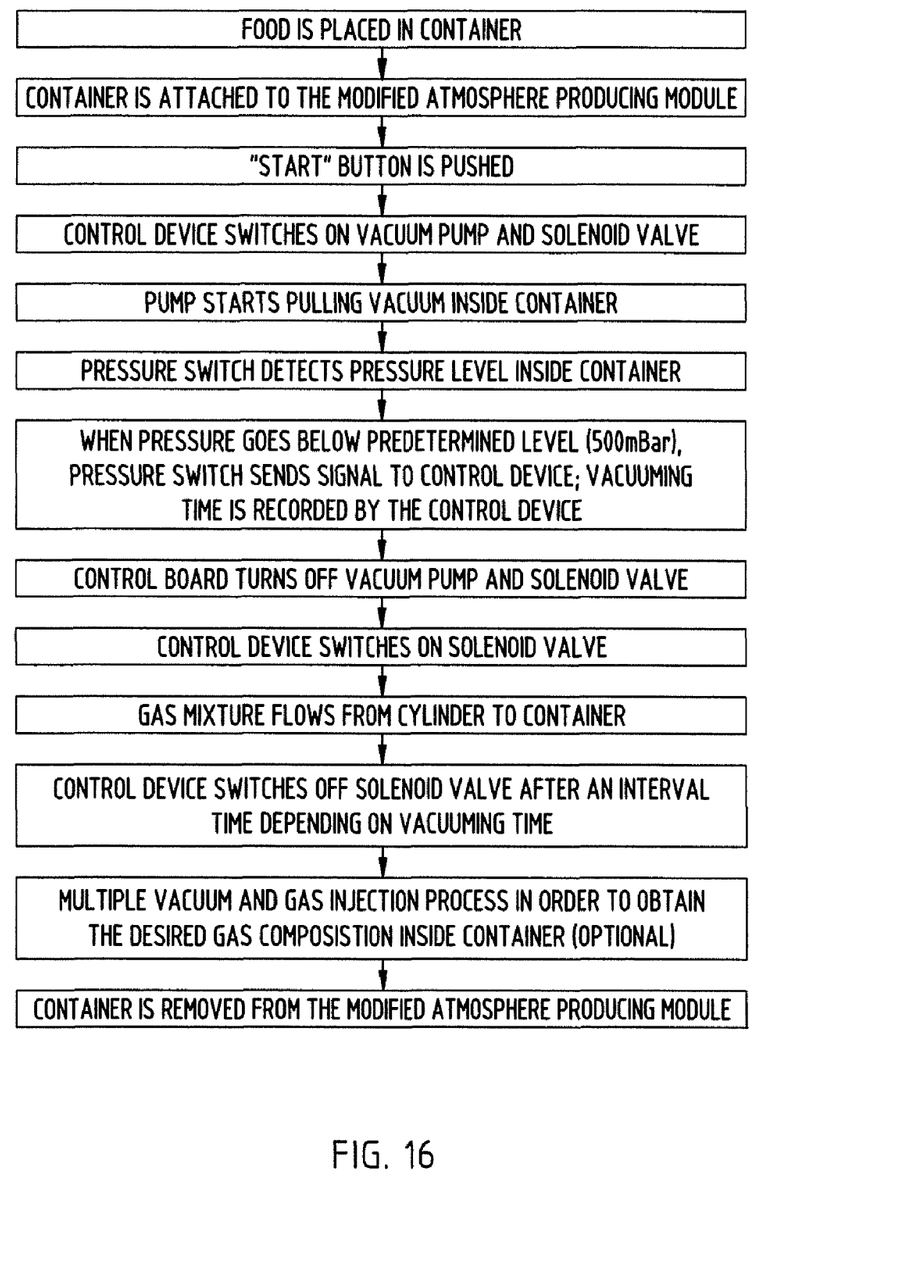
FIG. 16 shows a flowchart of a system for supplying a modified atmosphere to a rigid food retaining compartment/space according to an embodiment of the present invention.

A method of producing a modified atmosphere within a rigid container typically includes the steps shown in FIG. 16 and described below. First, a food to be stored under a modified atmosphere is placed within the container. Next, the rigid container is engaged to the modified atmosphere module. This can be by a screw-type engagement with the lid of the container or by other sealing type arrangement. Typically, a rigid container uses at least one valve to allow gas flow into and out of the container. Next, the user activates the module by pressing the "start" button on the control panel, which is typically located on the front of the module. The control device, a control board with a relay or a microcontroller, then switches on the vacuum pump and solenoid valve to allow gas to flow out of the container. Typically, a pressure switch detects the pressure level inside the container. When the pressure level reaches a level at or below at least about 500 mBar, the pressure switch sends a signal to the control device and the control device records the vacuum time and turns off the vacuum pump and solenoid valve. Next, the control device switches the solenoid valve blocking the flow of gas from the compressed gas cylinder into the open position and the gas or gas mixture is allowed to flow into the container. Typically, the gas is a gas mixture of preblended gas for a given modified atmosphere that is desired. The control board then switches off the solenoid valve after a time interval depending on vacuum time. Optionally, multiple vacuum and gas injection process can be used to obtain the desired gas composition inside the container. Finally, the container that has the modified atmosphere is sealed and removed from engagement with the module.

Figure 17:
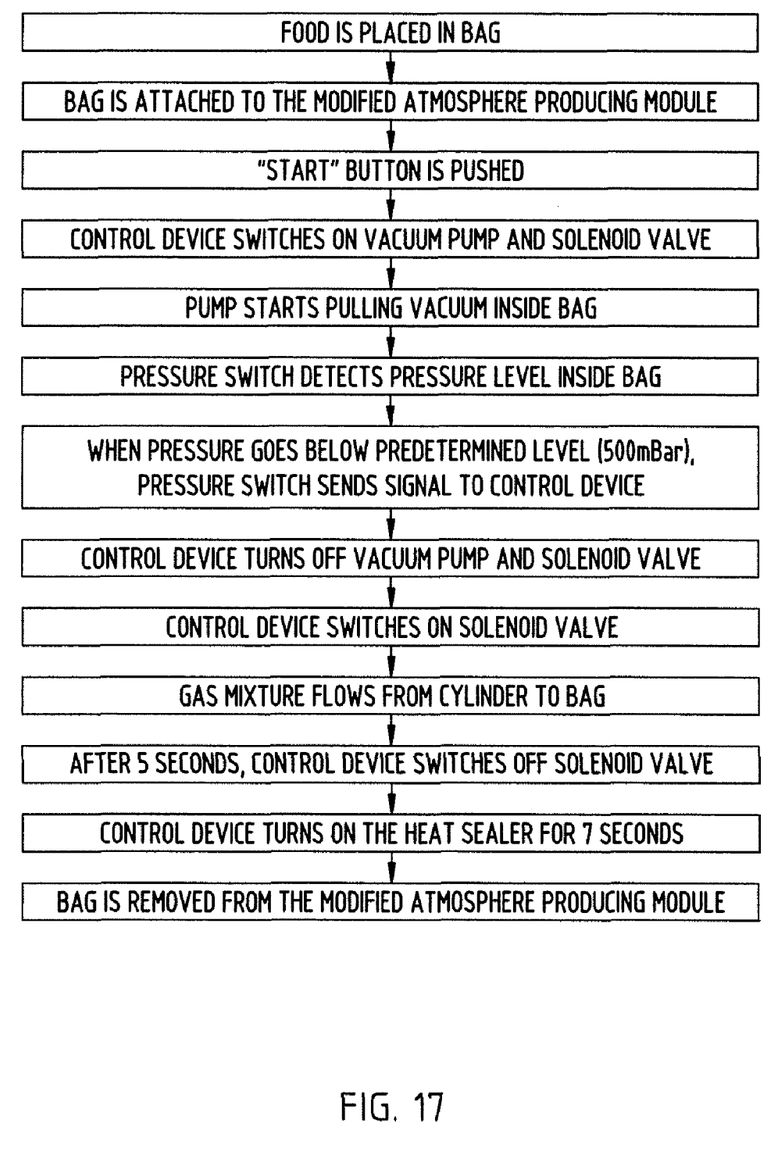
FIG. 17 shows a flowchart of a system for supplying a modified atmosphere to a food retaining bag according to an embodiment of the present invention.

A method of producing a modified atmosphere within a (flexible) bag container typically includes the steps shown in FIG. 17 and described below. The bag is attached to the module and the user pushes the "start" button. The control device switches on the vacuum pump and the solenoid valve thereby allowing gas to flow out of the bag. The vacuum pump pulls the gas from within the bag. When the pressure level reaches a level at or below at least about 500 mBar, the pressure switch sends a signal to the control device and turns off the vacuum pump and solenoid valve. Next, the control device switches the solenoid valve blocking the flow of gas from the compressed gas cylinder into the open position and the gas or gas mixture is allowed to flow into the bag. Typically, the gas is a gas mixture of preblended gas for a given modified atmosphere that is desired. Optionally, multiple vacuum and gas injection processes can be used to obtain the desired gas composition inside the bag. The control board then switches off the solenoid valve after about 5 seconds. Next, the control device typically turns on the heat sealer for about 7 seconds or for such time as necessary to form an air tight seal on the bag. Finally, the container that has the modified atmosphere is removed from engagement with the modified atmosphere module.

While a vacuum pump is typically used to draw ambient gas from within the food retaining compartment/space and the gas forming the modified atmosphere thereafter added to the food retaining compartment/space, it is also possible to form a modified atmosphere according to another embodiment of the present invention by using overpressure of modified atmosphere to force out the amount of ambient gas and replace this ambient gas with the modified atmosphere.

In another aspect of the present invention, the present invention includes a kit that typically includes at least: (1) at least one gas canister containing a gas or a blend of gases where the gas canister is capable of engaging a mounting location of a module and wherein the module is capable of being mounted to an inner liner of an appliance containing a refrigerator space and the appliance provides electrical power to the module and the module uses the gas or blend of gases from the canister to provide a modified atmosphere to food contained within a food retaining space that is re-sealably air tight; and (2) instructions that are transmitted to the user of the gas canister or canisters to engage the gas canister with the mounting location of the module. The instructions can be transmitted along with the gas canister or canisters or via a network of computers such as the Internet via a web site or web page hosted on a computer server accessible over the Internet. Also, as discussed above, the canister(s) can be constructed with an engagement outlet that will only allow air flow from the canister without damaging the canister when the canister is connected with the inlet of the module.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method of providing a modified atmosphere to a food storage space having a volume for enhancing the preservation of food stored in the food storage space when the food storage space contains the food and the modified atmosphere comprising the steps of:

providing a food storage space having a volume; a module removably connectable to an appliance that includes a first valve for regulating gas to or from the food storage space, a vacuum pump, and a gas canister engaging inlet;

at least one removable gas canister containing a compressed gas wherein the first valve is positioned between the gas canister and both the vacuum pump and the food storage space;

engaging the gas canister to the gas canister-engaging inlet of the module so as to operably connect the compressed gas with the module;

engaging the module with an appliance such that the module receives power from the appliance;

operably engaging the food storage space with the module such that gas is capable of moving out of and into the food storage space;

activating the module thereby causing the module to perform the steps comprising activating the vacuum pump and, if not already closed, closing the first valve to thereby draw an amount of ambient air from the food storage space; stopping the vacuum pump; and opening the first valve to allow gas flow from the gas canister into the food storage space; and filling the food storage space with at least a portion of the compressed gas from the gas canister thereby forming all or part of the modified atmosphere.

2. The method of claim 1, wherein one gas canister at a time is operably connected to the module; the modified atmosphere operates to reduce both aerobic and anaerobic pathogens and wherein the module further comprises a second valve positioned between the vacuum pump and the food storage space that is in an open position at least when the vacuum pump is active and closed when the compressed gas is being supplied to the food storage space.

3. The method of claim 2, wherein the gas canister has a predetermined blend of gases for a given type of food product wherein the food product comprises a food product chosen from the group consisting of a meat product, a dairy product, a fruit product, a vegetable product and a fish product and wherein the modified atmosphere for the meat product contains about 70% by volume oxygen, about 20% by volume carbon dioxide, and about 10% by volume nitrogen; the modified atmosphere for the fish product contains about 40% by volume carbon dioxide and about 60% by volume nitrogen; the modified atmosphere for fruits or vegetables contains from about 3% to about 10% by volume oxygen, from about 3% to about 10% by volume carbon dioxide, and from about 80% to about 94% by volume nitrogen; and the modified atmosphere for dairy products contains from about 10% to about 30% by volume carbon dioxide and from about 70% to about 90% by volume nitrogen.

4. The method of claim 2, wherein the first and second valves comprise solenoid valves and the valves, the vacuum pump and the module communicate with a microcontroller to carry out the steps of the method after activation of the module, operatively engaging the food storage space with the module, engaging the module with an appliance and engaging the gas canister with the gas canister-engaging inlet of the module and wherein the vacuum pump draws down the ambient air inside the food storage space until a pressure switch in communication with the microcontroller detects that the pressure within the food storage space is less than 500 mbar; thereafter, the microcontroller sends a signal to the vacuum pump to turn off the vacuum pump; thereafter, the microcontroller sends a signal to the second valve to open the valve and allow the gas from the gas canister to fill the food storage space and after an amount of time less than the amount of time the pump operated to remove the ambient air within the food storage space.

5. The method of claim 1, wherein the at least one removable gas canister further comprises an outlet and the gas canister engaging inlet and the outlet of the gas canister are adapted to only mate with one another and gas will not leave the canister unless the gas canister is engaged to the gas inlet without damaging the gas canister.

6. The method of claim 5, wherein the module detects the contents of the gas canister based upon the connection to the gas canister engaging inlet and the outlet of the gas canister using sensors that identify the contents of the gas canister.

7. The method of claim 6, wherein the gas canister has one or more identifiers on the canister that identify the contents of the canister and the appliance comprises an electrical appliance capable of supplying power to the module when the module is operably connected to the appliance and chosen from the group consisting of a freezer and an appliance containing a refrigerated space.

8. The method of claim 1, wherein the module has a rearward facing side and the step of engaging the module with an appliance such that the module receives power from the appliance comprises attaching the rearward facing side of the module to a surface of a door of the appliance.

9. A method of providing a modified atmosphere to a food storage space having a volume for enhancing the preservation of food stored in the food storage space when the food storage space contains the food and the modified atmosphere comprising the steps of:

removably engaging a module with an appliance such that the module receives power from the appliance wherein the module includes a first valve for regulating gas to or from a food storage space, a vacuum pump, and a gas canister engaging inlet;

operably engaging the food storage space with the module such that gas is capable of moving out of and into the food storage space;

activating the module thereby causing the module to perform the steps comprising:
  activating the vacuum pump and, if not already closed;
  closing the first valve to thereby draw an amount of ambient air from the food storage space; stopping the vacuum pump;
  opening the first valve to allow gas flow from a gas canister into the food storage space; and
  filling the food storage space with at least a portion of the compressed gas from the gas canister thereby forming all or part of the modified atmosphere.

10. The method of claim 9 further comprising the step of removing the module from engagement with the appliance.

11. The method of claim 9, wherein the module further comprises a first valve positioned between a gas canister and both the vacuum pump and the food storage space.

12. The method of claim 9, wherein the step of activating the module comprises the user pushing a button on the module and the method further comprises the step of removing the module from engagement with the appliance.

13. The method of claim 9 further comprising the step of operably connecting at least one gas canister to the module and the modified atmosphere is produced using the gas from the at least one gas canister having an outlet and the modified atmosphere operates to reduce both aerobic and anaerobic pathogens.

14. The method of claim 13, wherein the gas canister has a predetermined blend of gases for a given type of food product wherein the food product comprises a food product chosen from the group consisting of a meat product, a dairy product, a fruit product, a vegetable product and a fish product and wherein the modified atmosphere for the meat product contains about 70% by volume oxygen, about 20% by volume carbon dioxide, and about 10% by volume nitrogen; the modified atmosphere for the fish product contains about 40% by volume carbon dioxide and about 60% by volume nitrogen; the modified atmosphere for fruits or vegetables contains from about 3% to about 10% by volume oxygen, from about 3% to about 10% by volume carbon dioxide, and from about 80% to about 94% by volume nitrogen; and the modified atmosphere for dairy products contains from about 10% to about 30% by volume carbon dioxide and from about 70% to about 90% by volume nitrogen.

15. The method of claim 13, wherein the module further comprises a gas canister engaging inlet and the gas canister further comprises an outlet and the gas canister engaging inlet and the outlet of the gas canister are adapted to only mate with one another and gas will not leave the canister unless the gas canister is engaged to the gas inlet without damaging the gas canister.

16. The method of claim 13 further comprising the step of detecting the contents of the gas canister based upon the connection between the gas canister engaging inlet of the module and an outlet of the gas canister.

17. The method of claim 16, wherein the gas canister has one or more identifiers on the canister that identify the contents of the canister and the appliance comprises an electrical appliance capable of supplying power to the module when the module is operably connected to the appliance and the appliance is chosen from the group consisting of an appliance having a freezer compartment and an appliance having a refrigerated compartment.

18. A method of providing a modified atmosphere to a food storage space having a volume for enhancing the preservation of food stored in the food storage space when the food storage space contains the food and the modified atmosphere comprising the steps of:

engaging a removable module to a surface of an appliance such that the module draws power from the appliance;
placing food in a food retaining compartment chosen from the group consisting of a container and a bag;
activating the module;
pumping a vacuum in the food retaining compartment using at least a vacuum pump of the module and a valve of the module;
detecting the pressure level inside the food retaining compartment using a pressure switch of the module;
terminating the pumping step upon reaching a predetermined pressure level as measured by the pressure switch of the module;
delivering a gas mixture to the food retaining compartment from one or more gas canisters removably and operably connected to the module to form the modified atmosphere.

19. The method of claim 18 further comprising the step of detecting the contents of a gas canister of the one or more gas canisters based upon the connection between a gas canister engaging inlet of the module and an outlet of the gas canisters and wherein the module has a rearward facing side that engages the appliance and the step of engaging the module with an appliance such that the module receives power from the appliance comprises attaching the rearward facing side of the module to a surface of a door of the appliance.

20. The method of claim 18 further comprising the step of removing the module from engagement with the appliance.

* * * * *